United States Patent [19]
Zak et al.

[11] Patent Number: 5,157,567
[45] Date of Patent: Oct. 20, 1992

[54] COMPOSITE DISK DRIVE HEAD ASSEMBLY HAVING AN IMPROVED CORE-TO-SLIDER BOND

[75] Inventors: Brian S. Zak, Bloomington; Jenny A. Engebrit, Rosemount, both of Minn.

[73] Assignee: Seagate Technology, Inc., Scotts Valley, Calif.

[21] Appl. No.: 621,713

[22] Filed: Dec. 5, 1990

[51] Int. Cl.$^5$ .............................................. G11B 5/60
[52] U.S. Cl. .................... 360/103; 360/110; 360/122
[58] Field of Search ................ 360/103, 110, 122, 127

[56] References Cited

U.S. PATENT DOCUMENTS

| | | | |
|---|---|---|---|
| 4,779,154 | 10/1988 | Kakuno et al. | 360/103 |
| 5,010,431 | 4/1991 | Shinohara et al. | 360/103 |
| 5,055,958 | 10/1991 | Yagami et al. | 360/122 |

FOREIGN PATENT DOCUMENTS 61-283021 12/1986 Japan .................................. 360/103

Primary Examiner—John H. Wolff
Attorney, Agent, or Firm—Kinney & Lange

[57] ABSTRACT

An improved composite head assembly is achieved by using bonding glass to fasten the back leg of the core to an air-bearing slider. The improved bonding of the present invention results in improved rigidity of the head assembly and virtually eliminates tail draggers associated with the prior art.

3 Claims, 4 Drawing Sheets

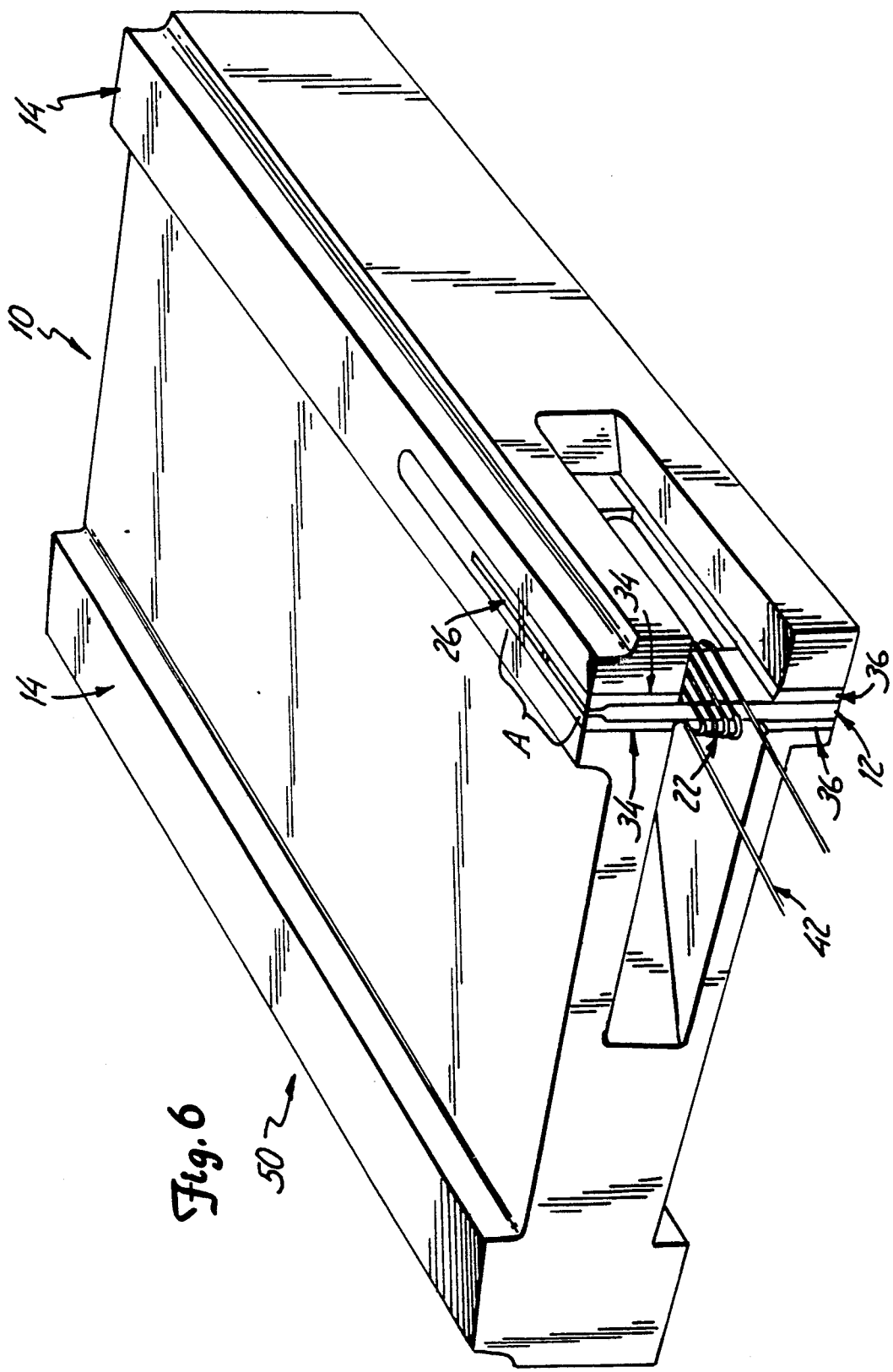

COMPOSITE DISK DRIVE HEAD ASSEMBLY HAVING AN IMPROVED CORE-TO-SLIDER BOND

BACKGROUND OF THE INVENTION

The present invention relates to a composite head assembly in a disk drive. In particular, the present invention relates to a head assembly which incorporates glass as a bonding material between the core and the slider on both the side of the core proximate the slider rail surfaces and on the side of the core opposite the rail side.

In a magnetic disk drive, information is stored in the form of magnetically polarized bit positions on a rapidly rotating disk. Information bit positions are arranged in generally concentric data tracks on the disk surface, and the tracks are further subdivided into sectors. Information transfer to and from the disk is accomplished by a transducer mounted in an air-bearing slider.

The transducer and air-bearing slider together comprise a head assembly. The slider is typically a catamaran-type, having two parallel "rail" surfaces which face the surface of the magnetic disk. These two surfaces are appropriately called the air bearing surface (ABS). A head suspension assembly positions the head assembly and applies a spring preload force, forcing the head assembly toward the disk's surface. Viscous drag forces cause a thin layer of air molecules to adhere to the surface of the disk when it is rotated. This layer of air is pulled under the slider's ABS and causes the head assembly to lift off the disk surface when sufficient rotational speed is reached. Thus, the head assembly flies in close proximity (approximately 10 microinches) to the disk surface, precisely balanced between aerodynamic forces and the applied preload spring force.

In a composite head assembly, a transducer is mounted in a ceramic slider. The transducer is comprised of a magnetic core (usually ferrite) and a coil of electrically conducting bifilar wire. The core is comprised of two sections. The first section of the core is a straight rectangular piece called the "I"-section. The second section of the core resembles a squared off C-shape and is called, appropriately enough, the "C"-section. When the two sections are joined during manufacturing, the completed core is essentially rectangular in shape and has a large opening in the center. The bifilar wire is wrapped (typically 30-60 turns) through the central opening and around a portion of the I-section. The upper edge, perpendicular to the segment of the I-section about which the wire is wrapped, is called the "track."

The track side of the core is machined down to a narrow thickness. The track side faces the magnetic disk in the final assembly and is positioned such that the track side is flush with the slider's rail surface and parallel to the information tracks on the disk.

A small space between the I-section and the C-section in the track side of the core defines the gap. The gap causes a disturbance in the magnetic flow through the core. This disturbance causes flux leakage necessary for the completed transducer to couple magnetically with the disk. The dimensions of the gap are critical to the electromagnetic characteristics of the transducer and proper functioning of the head assembly. The gap width is determined by the thickness of the track side of the core. The gap width is a limiting factor in the narrowness of the data tracks obtainable on the disk and, thus, directly influences the amount of information that can be stored on the disk.

The gap length is the distance between the edges of the I-section and the C-section where the two join on the track side of the core. The gap length is controlled by the thickness of a sputtered film placed on adjoining surfaces of the I-section and the C-section prior to their joining. The sputtered film also serves to act as a physical bonding agent between the I-section and the C-section. The gap length directly influences the minimum size of the bit positions on the data track and the amount of information that can be stored on the disk.

The upper segment of the C-section, where it forms the portion of the core's track side adjacent the gap, is narrowed by means of an angle formed in the inner surface which defines the C-section's portion of the core's central opening. This narrowing to a squared-off point is necessary to create the necessary flux leakage at the gap. The thickness of this squared-off point measured parallel to the I-section-to-C-section joining line is referred to as throat height. Accurate control of the throat height dimension during manufacturing is critical to predictable electromagnetic performance of the transducer.

The "back leg" of the core is the side of the C-section opposite and parallel the track side.

Prior art composite head manufacturing methods involve first inserting the core into machined upper and lower slots in the air-bearing slider and temporarily attaching the core to the slider with a small quantity of adhesive. A measured quantity of sealing glass is then laid on top of the track side of the core. Next, the slider and head are heated in an oven until the sealing glass melts and flows down into the upper slot between the core and the slider. The slider and core assembly is then cooled until the sealing glass resolidifies, forming a bond. Next, a liquid epoxy is introduced into the lower slot between the core and the slider.

The assembly is then heated until catalytic reactions in the epoxy cause it to solidify. After hardening of the epoxy, the slider's air bearing surfaces are lapped to a final finish dimension. The lapping process removes excess sealing glass from the slider surface and brings the track side of the core flush with the air bearing surface. Finally, bifilar wire is wrapped around the I-section in the area between the slots of the slider. The winding is done through a central opening in the core and through a winding window area which has been formed in the slider prior to insertion of the core into the slots.

Some problems inherent in head assemblies manufactured in accordance with the prior art are directly attributable to the use of epoxy in bonding the core's back leg side to the slider.

The presence of the machined slots and a winding window in the slider reduces its structural integrity. Epoxy exhibits more flexibility and a tendency to deform under load than the ceramic of which the slider is comprised. The epoxy's lack of rigidity reduces the ability of the core to restore the structural integrity of the side of the slider in which it is mounted. During final lapping of the slider rail surfaces, the portion of the slider in which the core is mounted deforms due to flexing of the epoxy bond. This deformation results in lack of straightness of the slider rail surface in the core area and impacts detrimentally on the head assembly's flying characteristics.

Another problem with prior art epoxy bonding of the back leg is flexing of the rail directly under the I-section during wire winding, resulting in rail deformation and protruding. This projection is called a "tail dragger" and its presence can directly effect fly characteristics. Improper fly height can adversely impact the electromagnetic performance of the transducer.

Finally, prior epoxy bonding is a slow manual method that can result in additional labor costs. Epoxy in liquid form is difficult to handle and changes viscosity over time. If the viscosity is too low when the epoxy is applied, it will flow too easily into places such as the winding area of the I-section where it must be removed before further processing. Epoxy present on the winding area can result in costly waste if unnoticed and the manufacturing process is allowed to proceed. If the viscosity of the epoxy is too high when it is applied, it will not flow well into the cavity between the slots in the slider and the core. If insufficient epoxy is present, a poor bond is achieved and more deformation of the slider during lapping and winding will be evident.

SUMMARY OF THE INVENTION

The present invention is a composite head assembly in which bonding glass is used to fasten the back leg section of the core to the slider. The use of bonding glass to bond the core to the slider results in improved structural rigidity of the head assembly in the core area, virtual elimination of tail draggers, and cost-reducing elimination of several processing steps.

In the present invention, a measured quantity of bonding glass is placed in a recess between the lower slider slots on top of the core's back leg section. The bonding glass is placed during the same manufacturing phase that the sealing glass is placed into the upper slots as described above in the prior art. In the present invention, the oven heating step melts the bonding glass and the sealing glass concurrently. After cooling, the slider rail surface can be lapped with improved precision and the wire winding can be done with no tail dragger formation.

BRIEF DESCRIPTION OF THE DRAWINGS

FIG. 6 is a perspective view of a complete head assembly made in accordance with the present invention.

DETAILED DESCRIPTION OF THE PREFERRED EMBODIMENTS

Figure 1:
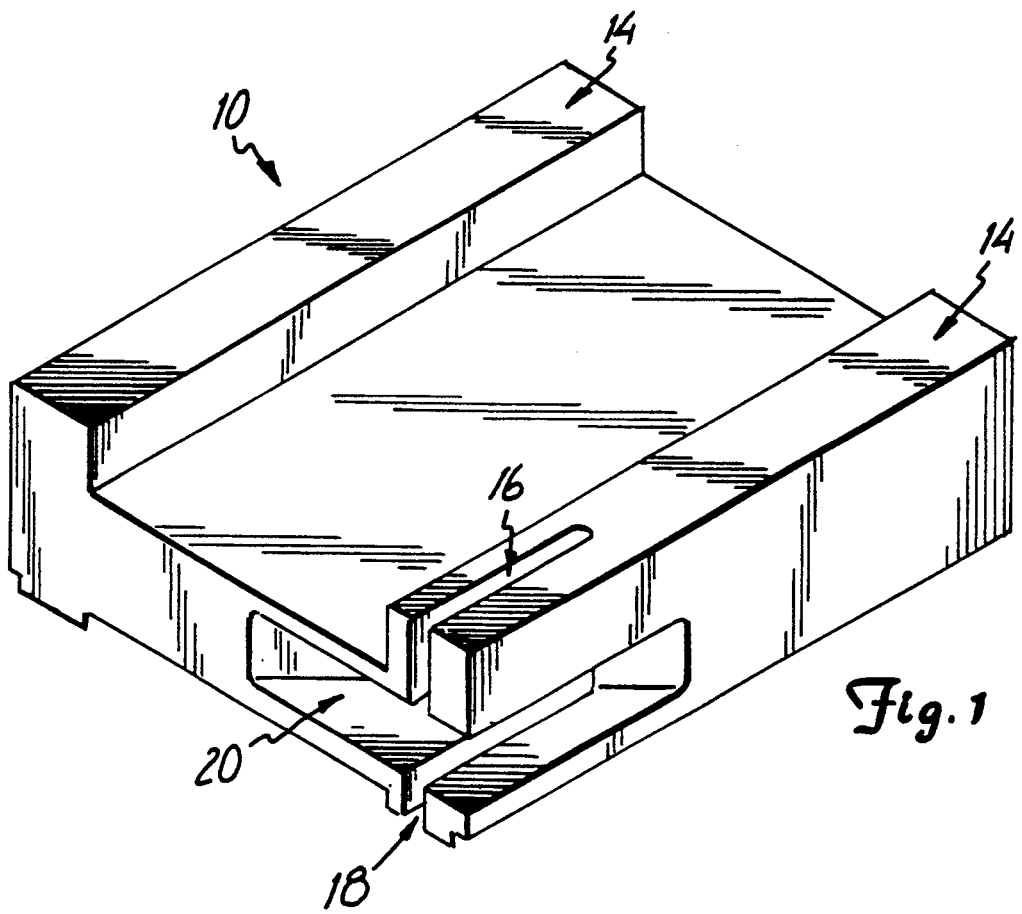
FIG. 1 is a perspective view of an air-bearing slider prior to assembly for use in a head assembly made in accordance with the present invention.
Figure 2:
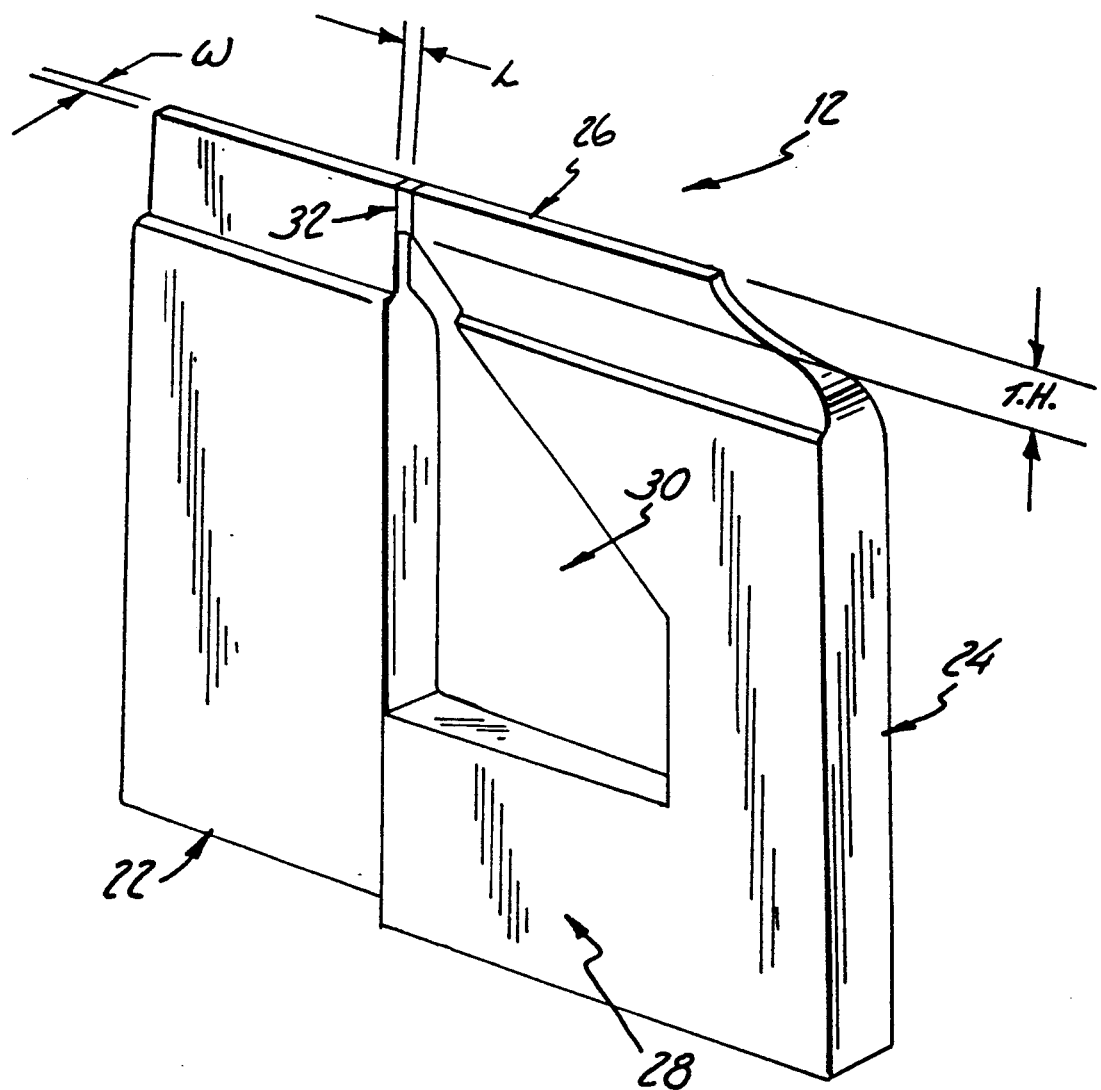
FIG. 2 is a perspective view of a magnetic core prior to assembly for use in a head assembly made in accordance with the present invention.

An air-bearing slider 10 is shown in FIG. 1 prior to insertion and bonding of magnetic core 12 (shown in FIG. 2). Air-bearing slider 10 has rails 14 for flying over the surface of the magnetic disk (not shown). Air-bearing slider 10 is comprised of a non-magnetic material, such as calcium titanate.

Upper slot 16 and lower slot 18 have been formed in air-bearing slider 10 to receive the magnetic core. A winding window 20 has been formed in slider 10 in order that a path for wire winding may be present during subsequent manufacturing steps.

A ferrite core 12 made in accordance with the present invention is shown in FIG. 2. Magnetic core 12 is comprised of I-section 22 and C-section 24. Core 12 has track side 26, back leg side 28, and central opening 30. I-section 22 and C-section 24 have been joined in a prior manufacturing step, leaving glass-filled gap 32 between I-section 22 and C-section 24 on track side 26. The distance "L" between I-section 22 and C-section 24 is the gap length. Track side 26 has been machined to dimension "W" which is also the gap width. Central opening 30 has been formed such that track side 26 of C-section 24 narrows to a squared-off point end at gap 32. The narrowing of C-section 24 at gap 32 defines throat height dimension "T.H." of the squared-off point end on track side 26.

Figure 3:
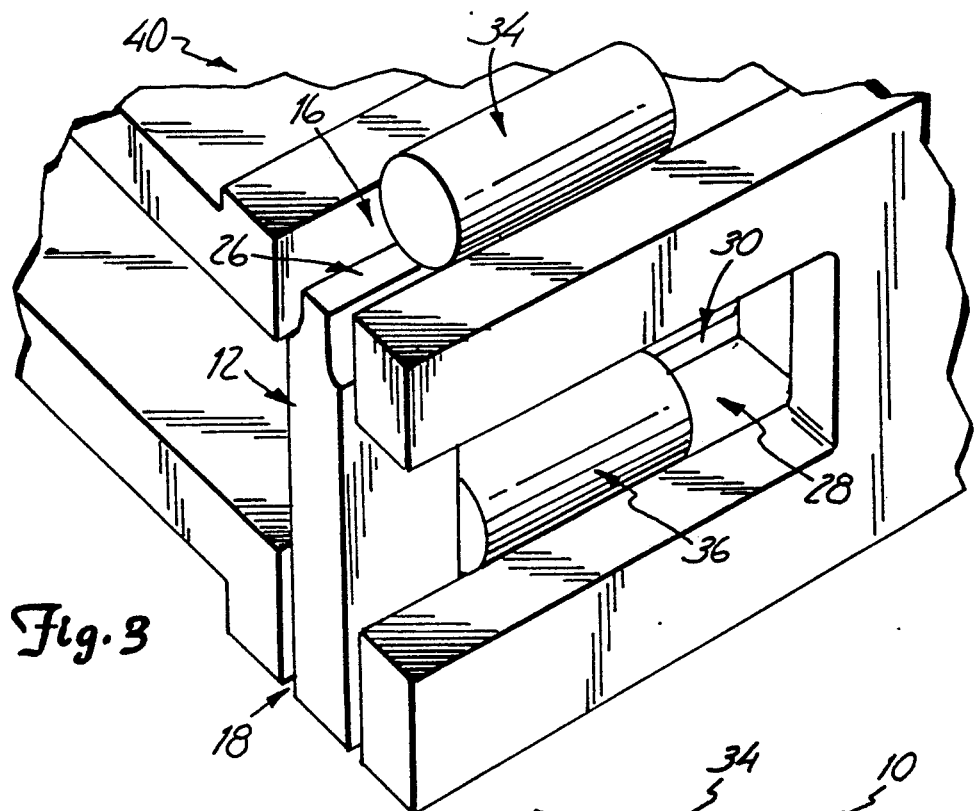
FIG. 3 is a detailed perspective view showing a core inserted into an air-bearing slider with unmelted sealing glass and bonding glass in position prior to oven heating in accordance with the present invention.

Unfinished head assembly 40 with core 12 inserted in upper slot 16 and lower slot 18 of air-bearing slider 10 just prior to oven heating is shown in FIG. 3. The core may be temporarily fastened to the slider by, for example, Locktite ™ No. 414 (not shown), to hold the core in place during the subsequent heating step. A block of unmelted sealing glass 34 which may be, for example, Glass No. SP-1590, manufactured by Specialty Glass Products, Inc., is shown resting on track side 26 of core 12. In accordance with the present invention, a block of unmelted bonding glass 36 which may be, for example, Glass No. SP-457 (manufactured by Specialty Glass Products, Inc., is shown resting in central opening 30 on back leg side 28 of core 12.

Figure 5:
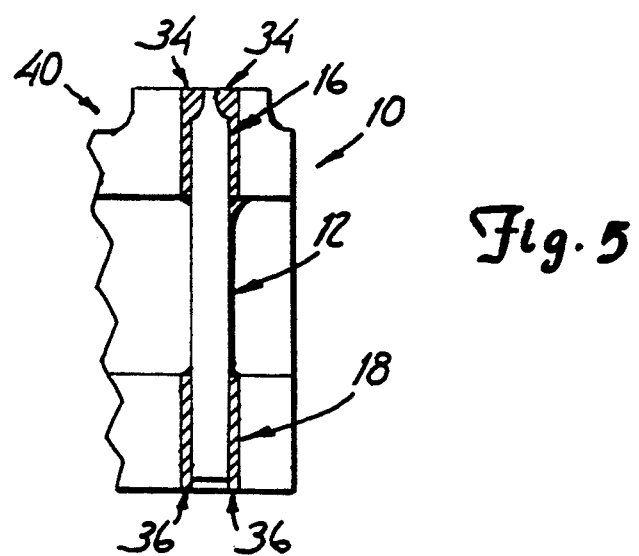
FIG. 5 is an end view of a core fastened to an air-bearing slider in accordance with the present invention.
Figure 4:
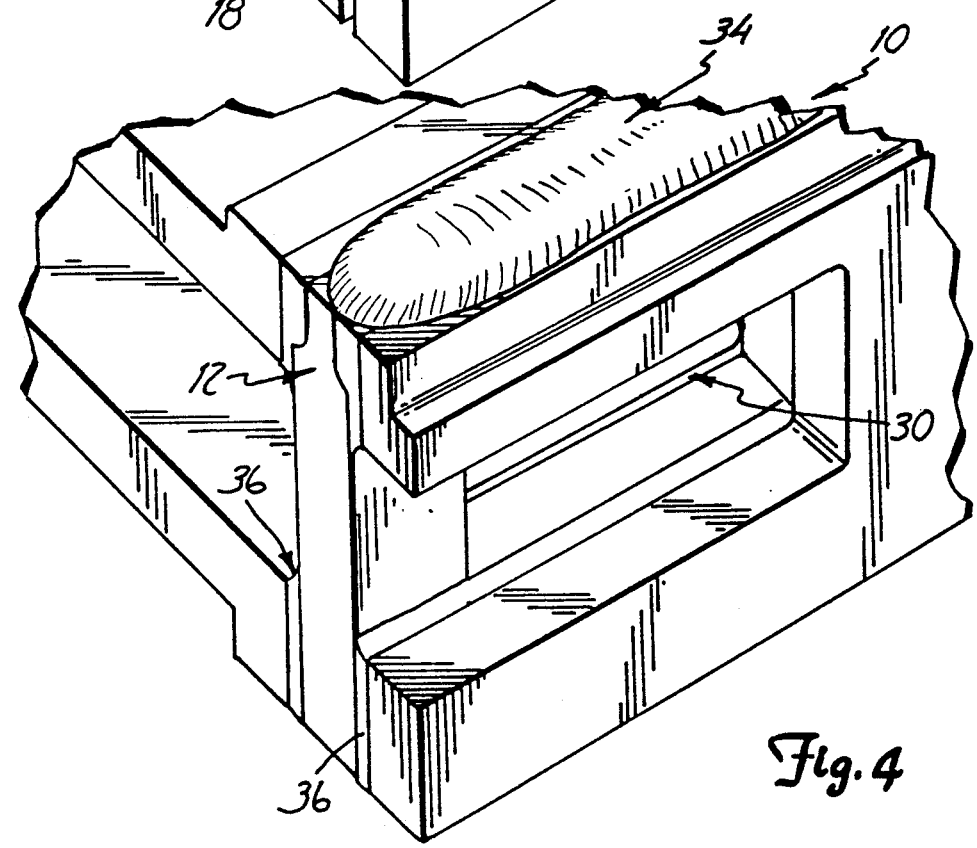
FIG. 4 is a detailed perspective view showing a core bonded to an air-bearing slider in accordance with the present invention.

Unfinished head assembly 40, after oven heating and melting of sealing glass 34 and bonding glass 36, is shown in FIG. 4. Melting of the sealing glass 34 and the bonding glass 36 may be accomplished, for example, by placing the assembly in an oven and raising the temperature to approximately 500° C. for approximately 40 minutes. FIG. 5, which is an end view of FIG. 4, shows how sealing glass 34 has melted and flowed into upper slot 16 to fill the space between slider 10 and core 12. In a similar manner, bonding glass 36 has melted and flowed into lower slot 18, filling the spaces between slider 10 and core 12.

A completed head assembly 50 in accordance with the present invention is shown in FIG. 6. Electrical conducting wire 42 has been wound around I-section 22 of core 12. The forces applied during winding have caused no tail dragger effect to rail surface in area 'A' which would interfere with fly height performance as would be the case with prior art epoxy bonding methods.

Upon cooling and resolidification, sealing glass 34 and bonding glass 36 rigidly connect air-bearing slider 10 to core 12. This allows core 12 to act as a rigid structural member, reinforcing the area of air-bearing slider 10 in which it is attached. During subsequent manufacturing steps, when rail surfaces 14 (shown in FIGS. 1 and 6) are lapped to final dimensions and straightness tolerances, the enhanced strengthening of air-bearing slider 10 by core 12 and incorporation of bonding glass 36 of the present invention enables these operations to be done more precisely.

The improved positioning rigidity of core 12 resulting from use of bonding glass 36 is also clearly evident in the more closely held tolerances of throat height dimensions T.H. (shown in FIG. 2) now possible. When rail surface 14 is lapped, some of the material of track side 26 of core 12 is removed, which in turn changes throat height dimension T.H. By holding core 12 more rigidly in place, use of the bonding glass 36 of the present invention allows more accurate control of the amount of core material removed during lapping of rail surfaces 14. Core 12 and slider 10 deflect less under the load applied during lapping when bonding glass 36 is used than when prior art epoxies are used.

Although the present invention has been described with reference to preferred embodiments, workers skilled in the art will recognize that changes may be made in form and detail without departing from the spirit and scope of the invention.

What is claimed is:

1. A disk drive head assembly comprising:
   a slider having upper and lower slots therein;
   an essentially rectangular core having a track side and an essentially parallel back leg side, wherein the core is mounted in the slider and positioned such that the track side of the core is in the upper slot of the slider and the back leg side of the core is positioned in the lower slot of the slider and wherein the core is bonded to the slider by means of sealing glass in the upper slot between the slider and the core and by means of bonding glass in the lower slot between the slider and the core, and wherein the sealing glass and the bonding glass have sufficiently close melting temperatures to permit both the sealing glass and the bonding glass to simultaneously bond the core to the slider during a common heating and cooling cycle; and
   electrically conducting wire wound around a portion of the core.

2. The disk drive head assembly of claim 1 wherein the slider is comprised of calcium titanate.

3. The disk drive head assembly of claim 2 wherein the core is comprised of ferrite.

* * * * *